US011958711B2

(12) United States Patent
Capoia

(10) Patent No.: US 11,958,711 B2
(45) Date of Patent: Apr. 16, 2024

(54) STACK OF LAMINAR MATERIAL FOR FORMING PACKAGES AND METHOD OF USE

(71) Applicant: PANOTEC S.R.L., Cimadolmo (IT)

(72) Inventor: Giuseppe Capoia, Cimadolmo (IT)

(73) Assignee: PANOTEC S.R.L., Cimadolmo (IT)

( * ) Notice: Subject to any disclaimer, the term of this patent is extended or adjusted under 35 U.S.C. 154(b) by 0 days.

(21) Appl. No.: 18/027,115

(22) PCT Filed: Oct. 21, 2021

(86) PCT No.: PCT/IB2021/059700
§ 371 (c)(1),
(2) Date: Mar. 19, 2023

(87) PCT Pub. No.: WO2022/084899
PCT Pub. Date: Apr. 28, 2022

(65) Prior Publication Data
US 2023/0331510 A1 Oct. 19, 2023

(30) Foreign Application Priority Data
Oct. 21, 2020 (IT) ........................ 102020000024862

(51) Int. Cl.
*B65H 45/101* (2006.01)
*B31B 50/02* (2017.01)
(Continued)

(52) U.S. Cl.
CPC ....... *B65H 45/1015* (2013.01); *B31B 50/022* (2017.08); *B31B 50/066* (2017.08);
(Continued)

(58) Field of Classification Search
CPC ..... B31B 50/02; B31B 50/022; B31B 50/066; B65B 41/02; B65H 45/101; B65H 2301/42162; B65H 2701/18242
(Continued)

(56) References Cited

U.S. PATENT DOCUMENTS 3,729,367 A * 4/1973 Shore ..................... B29D 30/52
206/820
6,514,185 B1 2/2003 Knuppertz et al.
(Continued)

FOREIGN PATENT DOCUMENTS

| | | | | |
|---|---|---|---|---|
| DE | 19711799 A1 * | 10/1998 | ............... | B31B 1/00 |
| DE | 19711799 A1 | 10/1998 | | |
| WO | 0138215 A1 | 5/2001 | | |

*Primary Examiner* — Jacob A Smith
(74) *Attorney, Agent, or Firm* — Themis Law

(57) ABSTRACT

A stack of laminar material for forming packages, the stack including full panels having a predetermined total length and formed with transverse creases along which the full panels are folded in accordion-like pleats. The stack includes at least one longitudinal cut on each full panel to form at least two transversely adjacent stacks of partial panels having respective partial widths, which are less than the total width. The at least one cut is incomplete, so that each partial panel of a respective stack and the partial panel of the stack adjacent thereto will have at least one connecting section therebetween, having a predetermined minimum length, for holding the partial panels of the adjacent stacks together, to thereby keep the adjacent stacks substantially aligned while facilitating the separation of each of the partial panels as they are unwound by a pulling action from each adjacent stack.

11 Claims, 3 Drawing Sheets

(51) Int. Cl.
*B31B 50/06* (2017.01)
*B65B 41/02* (2006.01)

(52) U.S. Cl.
CPC ...... *B65B 41/02* (2013.01); *B65H 2301/4236* (2013.01); *B65H 2701/11231* (2013.01)

(58) Field of Classification Search
USPC .............................................................. 53/50
See application file for complete search history.

(56) References Cited

U.S. PATENT DOCUMENTS

| | | | | |
|---|---|---|---|---|
| 8,056,600 | B1 * | 11/2011 | Judkins ................ | B31D 3/0215<br>428/116 |
| 2017/0127889 | A1 * | 5/2017 | Larsson ................. | A47K 10/20 |

* cited by examiner

STACK OF LAMINAR MATERIAL FOR FORMING PACKAGES AND METHOD OF USE

TECHNICAL FIELD

The present invention generally finds application in the field of packaging and particularly relates to a stack of laminar material for forming packages.

The invention also relates to a method of using the aforementioned stack of laminar material with automatic or semiautomatic machines and plants.

STATE OF THE ART

Laminar materials, typically corrugated cardboard, have been long known to be used in box package production in the form of stacks of adjacent panels intended to be loaded into loading units of an automatic or semiautomatic machine or plant for making boxes of desired sizes.

As used hereinafter, a "stack of laminar material" refers to a stack of panels, for example made of corrugated cardboard or a similar material, having predetermined longitudinal and transverse dimensions and folded into accordion or concertina pleats and joined together along transverse creasing lines.

Also, a "continuous web" refers to a web of laminar material having a predetermined total width and formed of a plurality of individual panels joined together along corresponding creasing lines and later folded into accordion or concertina pleats.

Generally, automatic box making machines or plants comprise at least one processing unit having tools for cutting and creasing panels.

Typically, at least one loading unit is located upstream from such creasing and cutting units and has one storage magazine for one or more stacks of continuous web panels and means for driving one panel at a time toward the creasing and cutting unit.

In order to increase the operating speed of the plant and to facilitate the processing operations, a plurality of adjacent stacks of panels of equal or different widths are arranged in the loading unit and are intended to successively feed the processing unit.

One drawback of this known system is that the panels of each stack tend to fall out of alignment and overlap along the edges, which affects their stability. Furthermore, due to this instability, the stacks must be limited in height, otherwise they would tend to bend and fall during transport and handling.

In an attempt to at least partially obviate these drawbacks, methods have been developed to avoid misalignment and promote compactness of the stacks during transport.

One known method is to wrap a stretch film around the side edges of the single panels of each stack or the side end edges of a plurality of adjacent stacks of single panels to compact each stack or retain the end edges of the mutually adjacent stacks.

Nevertheless, the use of stretch film affects the integrity of the edges of each panel. Furthermore, when the stack of panels is used in the loading station, the film must be removed and discarded, which leads to productivity losses and increased processing waste, and hence causes an environmental impact.

Further examples of methods which involve the management of stacks of laminar material are known from DE19711799A1, U.S. Pat. No. 3,729,367A and WO01/38215A1.

In short, the known methods of manufacturing or using adjacent stacks of laminar material to form packages are affected by reduced efficiency and poor cost-effectiveness, as well as high operation costs.

Technical Problem

In light of the prior art, the technical problem addressed by the present invention is to facilitate handling of the stacks of laminar material for making packages and afford easier unwinding thereof from continuous webs.

Disclosure of the Invention

The object of the present invention is to obviate the above drawback, by providing a stack of laminar material for forming packages and a method of using such stack of laminar material, that are highly efficient and cost-effective.

A particular object of the present invention is to provide a stack of laminar material from which at least two adjacent stacks of laminar material can be formed and which can avoid mutual misalignment of the adjacent stacks.

Another object of the present invention is to provide a method of using adjacent stacks of laminar material that affords easy unwinding thereof from a continuous web by a simple pulling action.

A further object of the present invention is to provide a stack of laminar material that allows the formation of adjacent stacks having high stability even when they have a considerable height.

Another object of the present invention is to provide a method of using adjacent stacks of laminar material that can limit processing waste and thus has a low environmental impact.

A further object of the present invention is to provide a stack of laminar material that can be easily handled.

These and other objects, as more clearly shown hereinafter, are fulfilled by a stack of laminar material, such as corrugated cardboard or the like, for forming packages, such stack comprising full panels having a predetermined total length and formed with transverse creases along which the full panels are folded in accordion-like pleats.

In a peculiar aspect of the invention, the stack comprises at least one longitudinal cut on each full panel to form at least two transversely adjacent stacks of partial panels having respective partial widths, which are less than the total width.

According to the invention, the at least one cut is incomplete, so that each partial panel of a respective stack and the partial panel of the stack adjacent thereto will have at least one connecting section therebetween, having a predetermined minimum length, for holding the partial panels of the adjacent stacks together, to thereby keep the adjacent stacks substantially aligned while facilitating the separation of each of the partial panels as they are being unwound by a pulling action from each adjacent stack.

The invention further relates to a method of using the adjacent stacks of laminar material according to claim 8.

Advantageous embodiments of the invention are obtained in accordance with the dependent claims.

BRIEF DESCRIPTION OF THE DRAWINGS

Further features and advantages of the invention will be more apparent from the detailed description of a stack of laminar material for forming packages and a method of using such stack, which are described as a non-limiting example with the help of the annexed drawings, in which.

DETAILED DESCRIPTION OF A PREFERRED EXEMPLARY EMBODIMENT

Particularly referring to the figures, there is shown a stack of laminar material for forming packages, such as corrugated cardboard or the like, generally designated by S.

Figure 1:
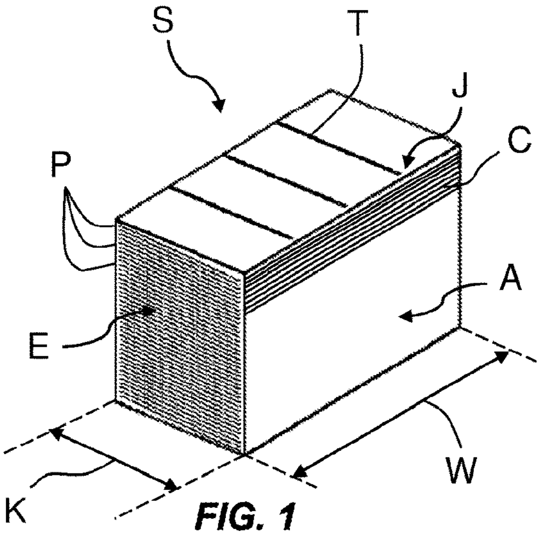
FIGS. 1 and 2 are front perspective and rear perspective views respectively of a stack of laminar material of the invention, according to a first embodiment.

As best shown in FIG. 1, the stack S comprises full panels P having a predetermined total length W and formed with transverse creases C along which the full panels P are folded in accordion-like pleats.

The stack S rests on a support surface G which defines a longitudinal direction L and a transverse direction V.

The initial stack S of full panels P can be made from a continuous web of laminar material, not shown, which is substantially longitudinal and has a predetermined total width W on which a plurality of transverse creasing lines C is formed, substantially equally spaced from each other by a length K.

Figure 2:
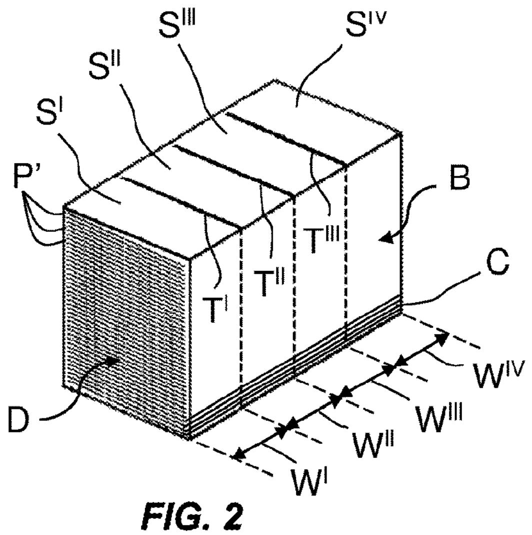

Then, the full panels P will be folded into accordion pleats along the creasing lines C to form the initial stack S which will have a front face A, a rear face B, and two side faces D, E, as best shown in FIGS. 1 and 2.

As a non-limiting example, the total width W may range from 400 mm to 3000 mm, whereas the length K may range from about 600 mm to 2500 mm.

The laminar material must be rigid enough to prevent deformation of the full panel P as it is being folded into accordion pleats and may have, for example, a thickness ranging from 2 mm to 8 mm.

According to a peculiar aspect of the invention, the stack S comprises at least one longitudinal cut T on each full panel P of the initial stack S, substantially orthogonal to the transverse creases C, to form at least two transversely adjacent stacks S', S" formed by partial panels P', P" whose respective partial widths W', W" are less than the total width W of the full panel P.

Advantageously, the at least one cut T is incomplete, so that each partial panel P' of a respective stack S' and the partial panel P" of the stack S" adjacent thereto will have at least one connecting section J therebetween, having a predetermined minimum length H, for holding the partial panels P', P" of the adjacent stacks S', S" together, as best shown in FIG. 2.

Figure 4:
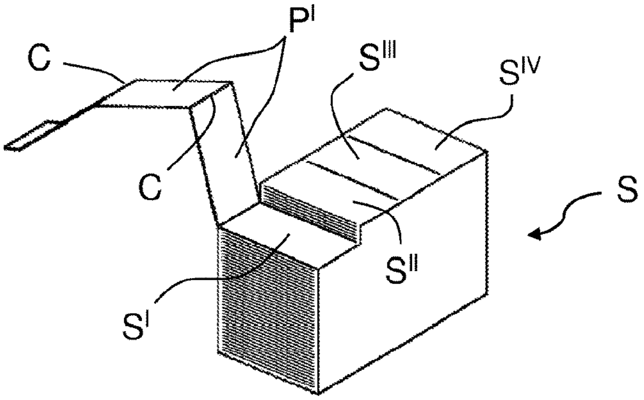
FIG. 4 is a perspective view of the stack of FIG. 3.

Thus, the adjacent stacks S', S" are held substantially aligned while facilitating separation of each of the partial panels P', P" as they are being unwound by a pulling action from each adjacent stack S', S", as best shown in FIG. 4.

In the example of the figures, each of the full panels P of the stack S has several longitudinal cuts T', T", T"', . . . formed thereon, spaced apart from each other to form a plurality of adjacent stacks S', S", S"', . . . of respective widths W', W", W"', . . . , as shown in FIG. 2.

By this arrangement, the panels P', P", P"', . . . of the adjacent stacks S', S", S"', . . . may be completely aligned and stably resting on the support surface G during the steps of use, that will be described below.

This provides the advantage that a plant for making box packages from partial panels P', P", P"', . . . picked up from the adjacent stacks S', S", S"', . . . , and formed with the above method, can avoid the use of a plurality of stacks arranged side by side and composed of totally disconnected panel, thereby affording a more stable and reliable production process.

By way of example, on a full panel P having a total width W of 2400 mm, three longitudinal cuts T', T", T"' can be formed, spaced apart by 600 mm, to provide four adjacent stacks of equal width, as shown in the figures.

By way of example, all the connecting sections J may have the same minimum length H ranging from 5 to 20 mm and the partial widths W, W', W"', . . . , may range from 200 mm to 1500 mm.

Figure 5:
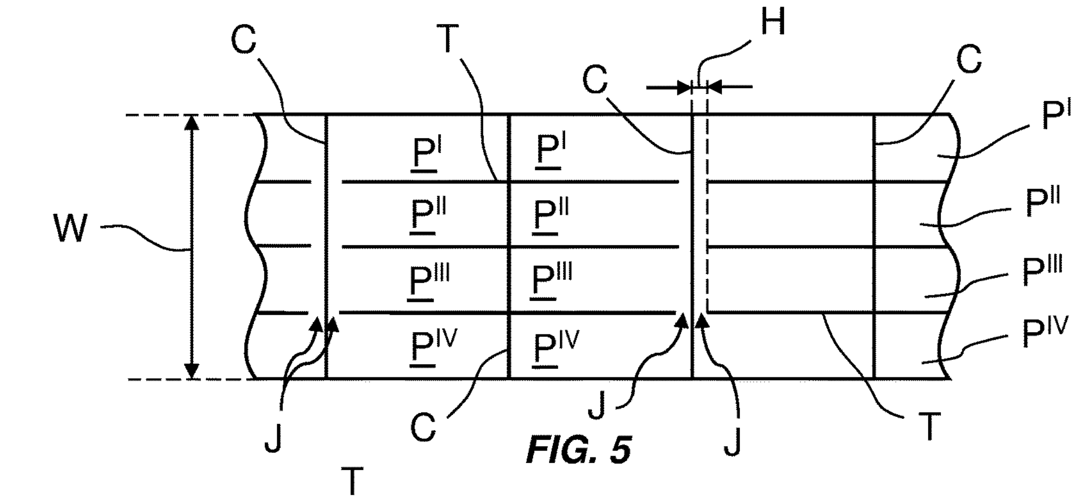
FIGS. 5 to 8 are top views of the partial panels of the stack in different embodiments of the invention.
Figure 6:
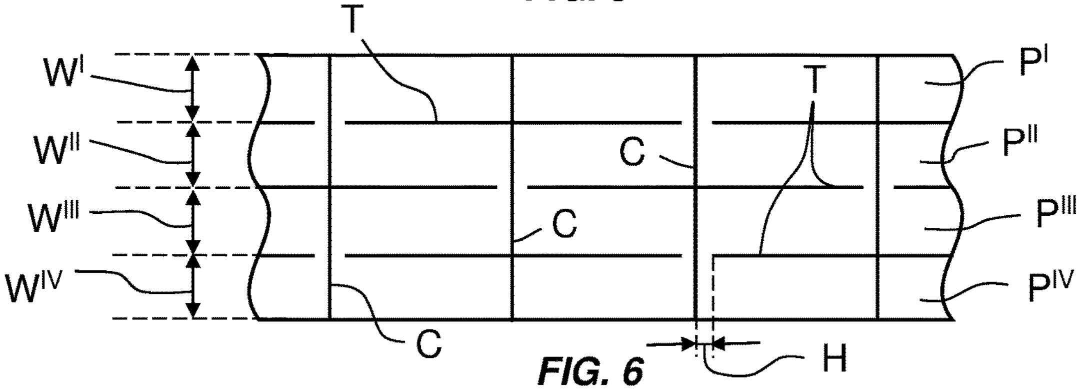

In a first embodiment, as shown in FIGS. 1, 2 and 5, the at least one connecting section J is located proximate to at least one of the transverse creases C of a respective full panel P and each longitudinal cut T touches the other transverse crease C. Alternatively, as best shown in FIG. 6, the longitudinal cut T and the connecting sections J alternate along each crease C.

Figure 3:
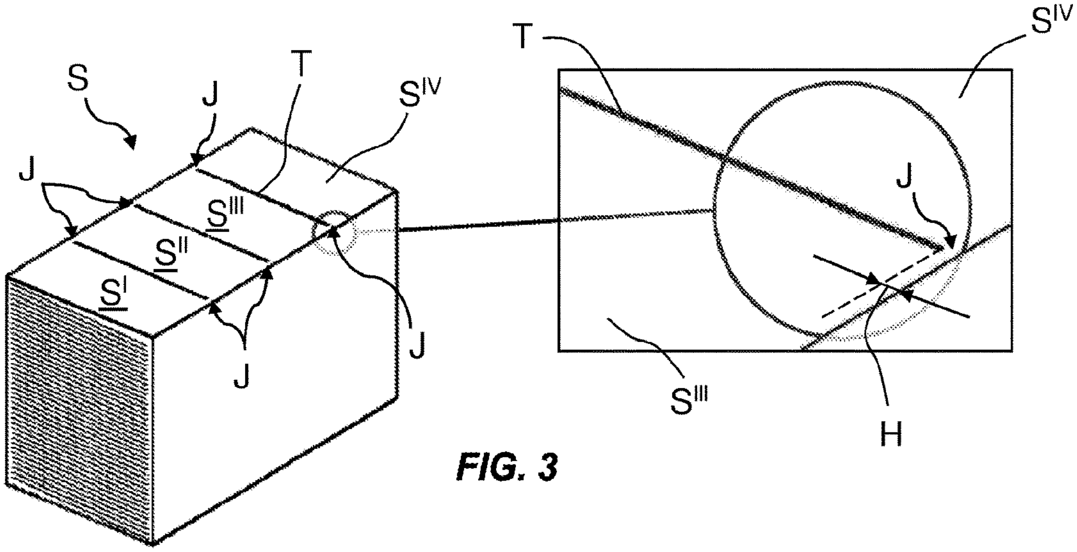
FIG. 3 is an enlarged perspective view of a stack of laminar material of the invention according to a second embodiment.
Figure 7:
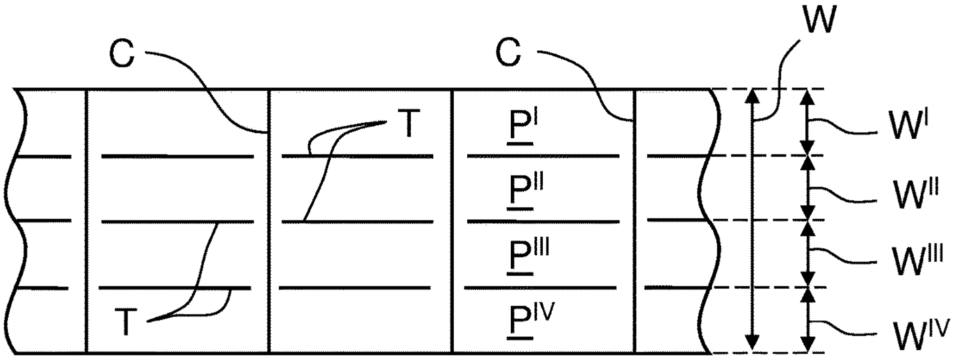

In a second embodiment, as shown in FIGS. 3, 4 and 7, all the connecting sections J are located proximate to both transverse creases C of each full panel P.

Therefore, each longitudinal cut T may be at least as long as the difference between the length K between the transverse creases C and twice the minimum length H, as best shown in FIG. 7.

Figure 8:
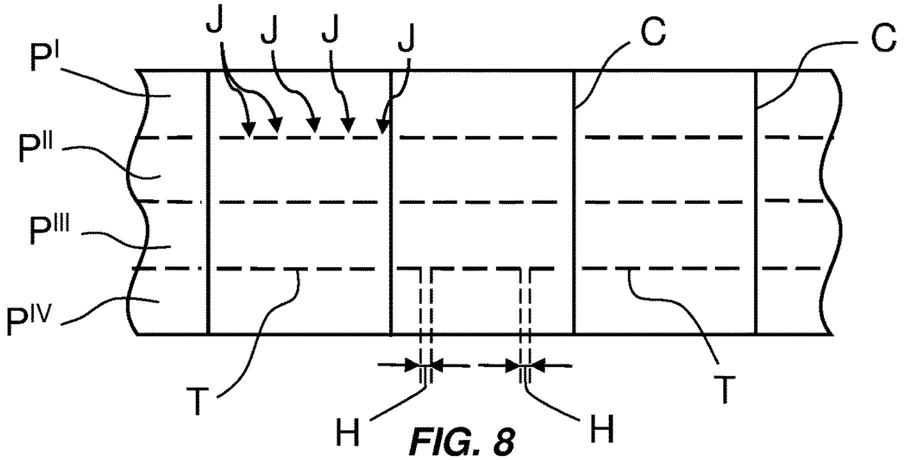

In an alternative embodiment, as shown in FIG. 8, the at least one longitudinal cut T is discontinuous and formed by a plurality of connecting sections J longitudinally aligned to more firmly join the partial panels P', P" of the adjacent stacks S', S".

Of course, this does not exclude that the arrangement of the at least one longitudinal cut T and the at least one connecting section J in each full panel P may be other than what is described or shown herein.

It will be appreciated that the stack S of laminar material as described herein can reduce processing waste, because the connecting sections J for promoting adhesion between one stack S' and the next adjacent stack S" are later used during processing of the laminar material.

Moreover, each connecting section J allows the plurality of adjacent stacks S', S", S"', . . . to have smaller dimensions and to be handled in a very simple manner, with no risk of falling or misalignment.

In operation, a series arrangement of a creasing machine for forming the creases C, and an automated folding machine for processing the creased laminar material may be provided to form the connecting sections J in a full stack P to obtain the adjacent stacks S', S", S"', . . . .

Then, an automatic machine may be provided, comprising a series of cutting tools of known type, for forming the at least one longitudinal cut T and the connecting sections J on each full panel P.

Alternatively, the longitudinal cuts T and the connecting sections J may be formed before folding the full panels P.

The latter configuration may provide a successive arrangement of a creasing machine for forming the creases C, a cutting machine for forming the at least one longitudinal cut T, and a folding machine for processing the creased laminar material formed with the longitudinal cuts T.

In a further aspect, the invention relates to a method of using a stack S of laminar material as described hereinbefore, and hence the adjacent stacks S', S", S", . . . , in a laminar material-loading unit of a plant for making custom box packages, as schematically shown in FIGS. 9 to 12.

Figure 9:
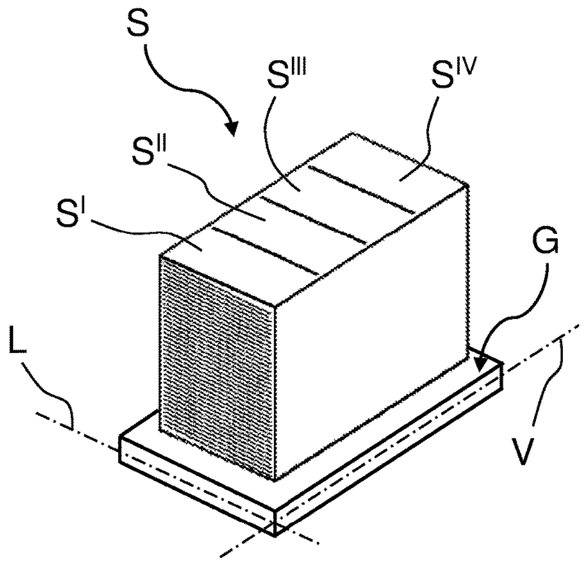
FIGS. 9 to 12 are perspective views of the stack of FIG. 3 in steps a) to d) of the method of use of the invention.
Figure 10:
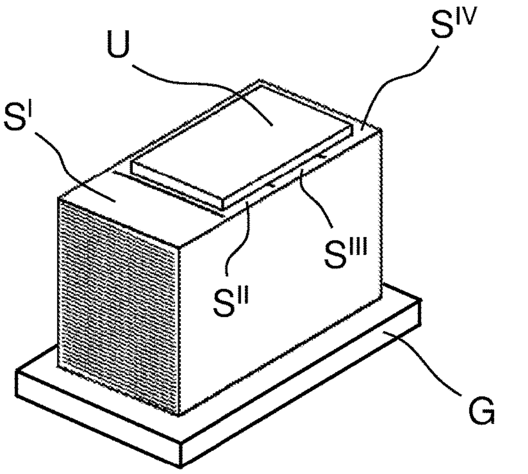

The method of use of the invention comprises a step of a) placing the stack S on the supporting surface G, as shown in FIG. 9 and a step of b) providing holding means U acting on the adjacent stacks S", S"', . . . except an initial stack S', for holding all the partial panels P", P"', . . . of the adjacent stacks S", S"', . . . , together, as shown in FIG. 10.

For simplicity, the holding means U are shown as a plate located above the adjacent stacks S", S"', . . . , but such holding means U may also comprise rollers or other devices for holding the partial panels P", P"', . . . of the adjacent stacks S", S"', . . . above the surface G.

Figure 11:
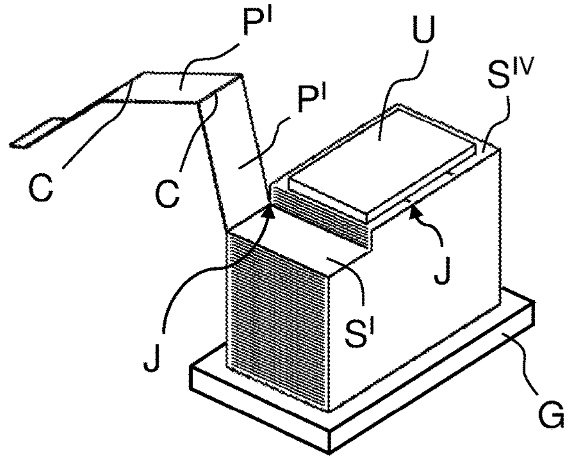

This is followed by a step of c) pulling the partial panels P' of the initial stack S', which is not retained by the holding means, by the loading unit, as shown in FIG. 11, to break the at least one connecting section J and allow the panels P' of the initial stack S' to be unwound, leaving the panels P", P"', . . . of the adjacent stacks S", S"', . . . retained on the support surface G and completely aligned.

Of course, the pulling step c) will be repeated for all the underlying panels P' of the stack S', to feed the loading unit for making the packages using the panels P'.

Figure 12:
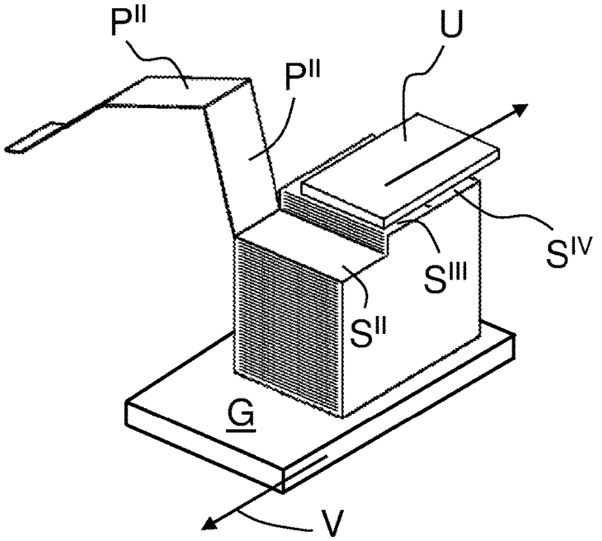

As best shown in FIG. 12, once all the panels P' have been unwound from the stack S' in step c), a following step consists in d) transversely displacing the support surface G, as well the holding means U, in the transverse direction V to allow the step c) to be repeated on the next adjacent stack S".

Of course, in the above step d) the support surface G is displaced in a direction V and in corresponding direction opposite to the transverse displacement of the holding means U.

As an alternative to what has been described herein, the step d) may comprise providing holding means U", U"', . . . acting upon all the adjacent stacks S", S"', . . . except the initial stack S' and, as the step c) is completed on the initial stack S', a step may be provided of d') transversely displacing the support surface G and removing one of the holding means U" from the next adjacent stack S" and then repeating the step c) on the next adjacent stack S".

It will be appreciated from the above that the stack of laminar material and the method of use of the invention fulfill the intended objects and namely facilitate handling of the stacks of laminar material for making packages and afford easy unwinding thereof from the continuous webs.

The stack and the method of use according to this invention are susceptible to a number of changes and variants within the inventive concept disclosed in the annexed claims.

While the stack and the method of use have been described with particular reference to the accompanying figures, the numerals referred to in the disclosure and claims are only used for the sake of a better intelligibility of the invention and shall not be intended to limit the claimed scope in any manner.

Reference herein to "one embodiment" or "the embodiment" or "some embodiments" indicates that a particular characteristic, structure or element that is being described is included in at least one embodiment of the inventive subject matter.

Furthermore, the particular characteristics, structures or elements may be combined together in any suitable manner to provide one or more embodiments.

INDUSTRIAL APPLICABILITY

The present invention may find application in industry because it can be manufactured on an industrial scale in factories for processing laminar materials into packages.

The invention claimed is:

1. A stack of laminar material for forming packages, the stack (S) comprising full panels (P) having a predetermined total length (W) and provided with transverse creases (C) along which said full panels (P) are folded in accordion-like pleats and comprises at least one longitudinal cut (T) on each full panel (P) to form at least two transversely adjacent stacks (S', S") of partial panels (P', P") having respective partial widths (W', W") which are less than said total width (W), said at least one cut (T) being incomplete, so that each partial panel (P') of a respective stack (S') and the partial panel (P") of the stack (S") adjacent thereto have at least one connecting section (J) therebetween, said connecting section (J) having a predetermined minimum length (H) for holding the partial panels (P', P") of the adjacent stacks (S', S") together, to thereby keep the adjacent stacks (S', S") substantially aligned while facilitating the separation of each of the partial panels (P', P") as they are being unwound by a pulling action from each adjacent stack (S', S").

2. The stack as claimed in claim 1, wherein said at least one connecting section (J) is located proximate to at least one of said transverse creases (C) of a respective full panel (P).

3. The stack as claimed in claim 1, wherein said at least one longitudinal cut (T) is discontinuous and formed by a plurality of connecting sections (J) longitudinally aligned to firmly join the partial panels (P', P") of the adjacent stacks (S', S").

4. The stack as claimed in claim 1, wherein said at least one connecting section (J) has a predetermined minimum length (H) ranging from 5 to 20 mm.

5. The stack as claimed in claim 1, further comprising a plurality of longitudinal cuts (T, T', T", . . . ) parallel and mutually spaced from each other to form respective panels (P', P", P"', . . . ) having respective partial widths (W', W", W"', . . . ).

6. The stack as claimed in claim 1, wherein said total width (W) ranges from 400 mm to 3000 mm and said partial widths (W', W", W"', . . . ) range from 200 mm to 1500 mm.

7. The stack as claimed in claim 1, wherein said at least one longitudinal cut (T) and said at least one connecting section (J) are formed before folding said full panels (P) into accordion-like pleats.

8. A method of use of a stack (S) of laminar material as claimed in claim 1, in a laminar material-loading unit of a plant for making box packages, the method comprising:

a) placing said stack (S) on a support surface (G);

b) providing holding means (U) acting on said adjacent stacks (S", S"', . . . ) except an initial stack (S'), to hold all the partial panels (P', P"', . . . ) of said adjacent stacks (S", S"', . . . ) together;

c) pulling the first of said partial panels (P') of said initial stack (S') to break said one or more connecting sections (J) and allow the panels (P') of said initial stack (S') to be unwound, leaving the panels (P", P"', . . . ) of said adjacent stacks (S", S"', . . . ) retained on said support surface (G) and completely aligned.

9. The method as claimed in claim 8, further comprising, as step c) is completed on the initial stack (S') and all the partial panels (P') of said unretained stack (S') have been unwound:

d) transversely displacing said support surface (G) and said holding means (U) and repeating step c) on the next adjacent stack (S").

10. The method as claimed in claim 9, wherein in said step d), the transverse displacement of said support surface (G) occurs in a relative direction opposite to the transverse displacement of said holding means (U).

11. The method as claimed in claim 8, wherein step d) comprises providing holding means (U", U'", . . . ) acting on all the adjacent stacks (S", S'", . . . ) except an initial stack (S'), a step being provided, as Gad step c) is completed on said initial stack (S') and all the partial panels (P') of said unretained stack (S') have been unwound, of d') transversely displacing said support surface (G), removing one of said holding means (U") from the adjacent stack (S") and repeating step c) on said next adjacent stack (S").

* * * * *